United States Patent
Zhang et al.

(10) Patent No.: US 9,140,947 B2
(45) Date of Patent: Sep. 22, 2015

(54) ARRAY SUBSTRATE, METHOD FOR REPAIRING THE SAME AND DISPLAY APPARATUS

(71) Applicants: BOE Technology Group Co., Ltd., Beijing (CN); Beijing BOE Display Technology Co., Ltd., Beijing (CN)

(72) Inventors: Ming Zhang, Beijing (CN); Bo Liu, Beijing (CN); Lianlong Gao, Beijing (CN); Xing Ma, Beijing (CN); Honghui Wang, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 0 days.

(21) Appl. No.: 14/447,951

(22) Filed: Jul. 31, 2014

(65) Prior Publication Data

US 2015/0227011 A1 Aug. 13, 2015

(30) Foreign Application Priority Data

Feb. 10, 2014 (CN) .......................... 2014 1 0046075

(51) Int. Cl.
  *G02F 1/13* (2006.01)
  *G02F 1/1362* (2006.01)
  *G02F 1/1368* (2006.01)

(52) U.S. Cl.
  CPC ........ *G02F 1/136259* (2013.01); *G02F 1/1368* (2013.01); *G02F 1/136286* (2013.01)

(58) Field of Classification Search
  CPC .................... G02F 1/136259; G02F 1/136286; G02F 1/1368
  See application file for complete search history.

(56) References Cited

U.S. PATENT DOCUMENTS

2009/0230398 A1* 9/2009 Park ............................... 257/59

\* cited by examiner

*Primary Examiner* — Roy Potter
*Assistant Examiner* — Paul Patton
(74) *Attorney, Agent, or Firm* — Westman, Champlin & Koehler, P.A.

(57) ABSTRACT

Embodiments of the present invention provide an array substrate, a method for repairing the array substrate and a display apparatus. The array substrate comprises: a thin film transistor; a pixel electrode; a gate line and a data line crossing with each other; and a repairing layer connected electrically to the pixel electrode, wherein the repairing layer has an area within a preset area range of the repairing layer which depends on an area of a repairing light spot, and wherein the repairing layer has a pattern comprising at least one hollow portion.

19 Claims, 5 Drawing Sheets

ARRAY SUBSTRATE, METHOD FOR REPAIRING THE SAME AND DISPLAY APPARATUS

CROSS-REFERENCE TO RELATED APPLICATION

This application claims the benefit of Chinese Patent Application No. 201410046075.3 filed on Feb. 10, 2014 in the State Intellectual Property Office of China, the whole disclosure of which is incorporated herein by reference.

BACKGROUND OF THE INVENTION

1. Field of the Invention

The present disclosure relates to the technical field of display, more particularly, relates to an array substrate, a method for repairing the array substrate and a display apparatus.

2. Description of the Related Art

A TFT-LCD (Thin Film Transistor Liquid Crystal Display), as a panel display apparatus, is applied in a high performance display field more and more as it has characteristics, such as small volume, low power consumption, non-radiation and low manufacturing cost. The TFT-LCD is composed of an array substrate and a color filter substrate. Liquid crystal is filled between the array substrate and the color filter substrate. By controlling the deflection of liquid crystal, light intensity may be controlled and then an image is displayed by the color filter substrate.

The conventional process of producing the TFT-LCD mainly includes four stages, i.e., a process of producing the color filter, an Array process (array substrate manufacturing), a Cell process and a Module (assembly) process. A Cell Test process may be further provided between the Cell process and the Module process. In the Cell Test process, it is found that, when impurities such as dusts, organics, metal are adsorbed to regions in the display panel close to the color filter, sub-pixels corresponding to these regions often transmit the light with a luminance much greater than that of other normal sub-pixels, i.e., generating a phenomenon of bright pixel defect. For example, taking a normally white picture display mode of a liquid crystal panel as an example, pixels in such liquid crystal panel are displayed as white color without being energized electrically while the pixels are normally displayed as black color with being energized electrically. If a pixel energized electrically is displayed as white color instead of black color, the pixel will be called as a bright pixel. Such bright pixel which cannot be controlled may cause light leak of the display panel and may degrade the quality of the display panel seriously, and thus it needs to repair the sub-pixels with the bright pixel defect.

With reference to a display panel in prior art, as illustrated in FIG. 1, it comprises a gate line 11 and a data line 12 crossing with each other; a thin film transistor (TFT) arranged at the crossing positions of the gate line 11 and the data line 12; a common electrode line 13 parallel to the gate line 11; and a pixel electrode 14 connected to a drain electrode of the TFT. In order to repair the bright pixel defect in display panel, generally, the pixel with the bright pixel defect is darkened by a laser welding, in particular, the pixel electrode 14 with the bright pixel defect is provided with a repairing point 15 and the laser welding is performed at the repairing point 15. By the laser, ITO for forming the pixel electrode 14 is melt and is electrically conducted to the gate metal layer for forming the gate electrode of the TFT. At that time, the driving voltage for the pixel with the bright pixel defect varies as the voltage of the signal varies, and the liquid crystal molecules of the pixel are always in deflection state to present the effect of a dark pixel.

In the conventional repairing process, in order to reduce the coupling effect of parasitic capacitance between the pixel electrode 14 and the gate line 11 to avoid the degradation of the display effect (the jumping of the gate voltage may cause charge redistribution inside the pixel thereby causing variation of the pixel voltage), it is necessary to set the size of the repairing point as small as possible to reduce the coupling effect of parasitic capacitance.

SUMMARY OF THE INVENTION

Embodiments of the present invention provide an array substrate, a method for repairing the array substrate and a display apparatus which can increase the repairing region of the pixel while reducing the parasitic capacitance.

In order to achieve the above object, the present invention may be implemented as the following embodiments.

According to an aspect of the present disclosure, it provides an array substrate, comprising: a thin film transistor; a pixel electrode; a gate line and a data line crossing with each other; and a repairing layer connected electrically to the pixel electrode, wherein the repairing layer has an area within a preset area range of the repairing layer which depends on an area of a repairing light spot, and wherein the repairing layer has a pattern comprising at least one hollow portion.

According to another aspect of the present disclosure, it provides a display apparatus comprising an array substrate, the array substrate comprising: a thin film transistor; a pixel electrode; a gate line and a data line crossing with each other; and a repairing layer connected electrically to the pixel electrode, wherein the repairing layer has an area within a preset area range of the repairing layer which depends on an area of a repairing light spot, and wherein the repairing layer has a pattern comprising at least one hollow portion.

According to a yet aspect of the present disclosure, it provides a method for repairing an array substrate, the array substrate comprising: a thin film transistor; a pixel electrode; a gate line and a data line crossing with each other; and a repairing layer connected electrically to the pixel electrode, wherein the repairing layer has an area within a preset area range of the repairing layer which depends on an area of a repairing light spot, and wherein the repairing layer has a pattern comprising at least one hollow portion and at least two solid portions, the method comprising: when the repairing light spot contacts with the solid portions, forming a first via on a surface of the pattern of the repairing layer by melting the solid portions with the repairing light spot, such that the solid portions are electrically connected to a gate electrode of the thin film transistor by the first via.

BRIEF DESCRIPTION OF THE DRAWINGS

The above and other features of the present invention will become more apparent by describing in detail exemplary embodiments thereof with reference to the accompanying drawings. The skilled person in the art would appreciate that the following drawings only shows some embodiments of the present invention, but the present invention is not limited to these drawings by any way.

DETAILED DESCRIPTION OF PREFERRED EMBODIMENTS OF THE INVENTION

Figure 1:
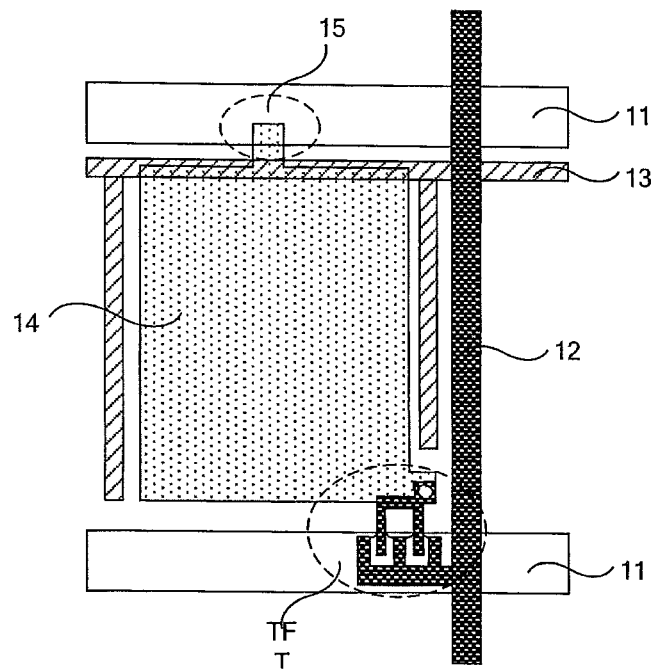
FIG. 1 is a schematic view of an array substrate in the prior art.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In accordance with a general concept of the present invention, it provides an array substrate, comprising: a thin film transistor; a pixel electrode; a gate line and a data line crossing with each other; and a repairing layer connected electrically to the pixel electrode, wherein the repairing layer has an area within a preset area range of the repairing layer which depends on an area of a repairing light spot, and wherein the repairing layer has a pattern comprising at least one hollow portion.

Figure 2:
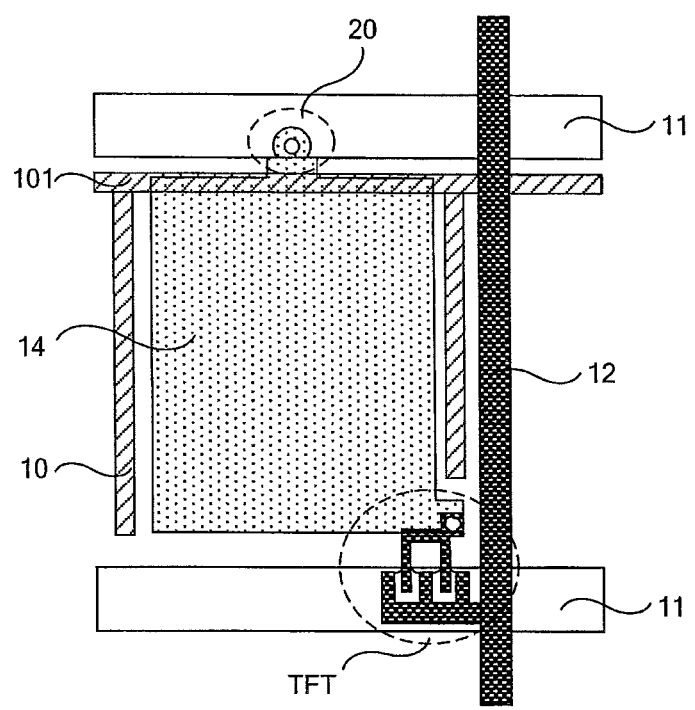
FIG. 2 is a schematic view of an array substrate according to an embodiment of the present invention.

In an embodiment, as illustrated in FIG. 2, an array substrate includes a thin film transistor TFT, a pixel electrode 14, a gate line 11 and a data line 12 crossing with each other, and may further include:

a repairing layer 20 connected electrically to the pixel electrode 14, wherein the repairing layer 20 has an area within a preset area range of the repairing layer.

It should be noted that, in an embodiment of the present invention, the repairing layer 20 may be an upper substrate or a lower substrate forming a parasitic capacitance, for example, as shown in FIG. 2, the repairing layer 20 and the gate line 11 constitute the parasitic capacitance and the repairing layer 20 may be the upper substrate of the parasitic capacitance. Thus, the repairing layer 20 in FIG. 2 does not include a connecting part between the gate line 11 and the pixel electrode 14.

Figure 3:
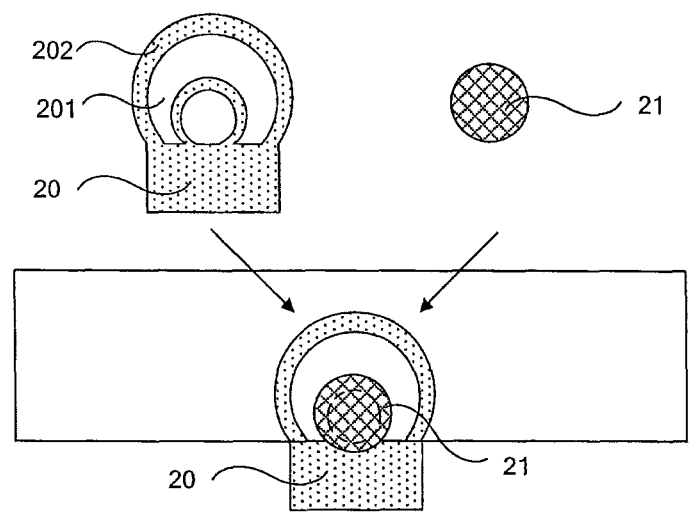
FIG. 3 is a schematic view of a structure of a repairing layer according to an embodiment of the present invention.

As illustrated in FIG. 3, the repairing layer 20 has a pattern which includes at least one hollow portion 201.

It should be noted that in the process of repairing the bright pixel, it needs to provide a repairing laser beam emitted by a repairing laser and the repairing laser beam has a light spot, i.e., a repairing spot 21, which falls in a region where the repairing layer 20 is located. In this way, the region can be melt to repair the pixel. Thus, the above preset area range of repairing layer may be a preset area range, which may be determined in particular depending on the above area of the repairing light spot 20. For example, the area of the repairing layer 20 may be greater than the area of at least one repairing light spot 21, which may increase the chance that the repairing light spot 21 falls in the region where the repairing layer 20 is located.

Since the repairing light spot typically may have a diameter d of 5 μm~10 μm, as an example, the repairing layer 20 may have an area greater than 16 μm² so as to achieve the repairing process.

In addition, if the pattern of the repairing layer 20 includes the hollow portion 201, the area of the repairing layer 20 will include the area of the hollow portion 201. The area of the repairing layer 20 is desired to be greater than 16 μm² such that at least one repairing light spot 21 can fall into the repairing layer 20 in the repairing process to repair the pixel. The object of providing the hollow portion 201 is to reduce the parasitic capacitance between the repairing layer 201 and other film layers such as the gate line 11, the common electrode 10 or the common electrode line 101 on the array substrate.

It should be noted that when producing the above hollow portion 201, the area of the hollow portion 201 may be increased as large as possible, so as to reduce the parasitic capacitance between the repairing layer and other conductive layers such as the gate line 10 and the common electrode 10 on the array substrate as possible as it can, and thus the capacitance coupling effect caused by the parasitic capacitance can be reduced to prevent the display quality of the pixel from being degraded by the parasitic capacitance.

An embodiment of the present invention provides an array substrate. It includes a thin film transistor, a pixel electrode, a gate line and a data line crossing with each other and a repairing layer. The repairing layer is electrically connected to the pixel electrode, has an area within the preset area range of the repairing layer and has a pattern including at least one hollow portion. In this way, the above hollow portion may be used to reduce the coupling effect of the parasitic capacitance between the repairing layer and the gate line or the common electrode or the common electrode line. In addition, by increasing the area of the repairing layer, it may reduce the alignment difficulty of the repairing laser beam during repairing the bright pixel such that the repairing efficiency can be enhanced and the yield of products can be improved.

Figure 4A:
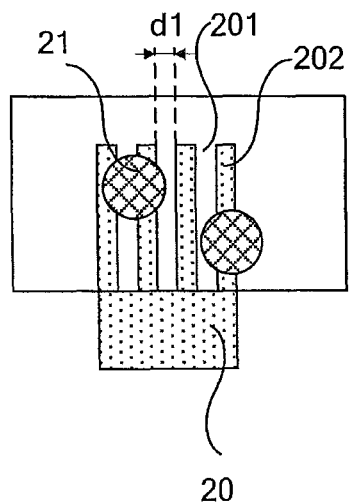
FIG. 4a is a schematic view of another structure of a repairing layer according to an embodiment of the present invention.
Figure 4B:
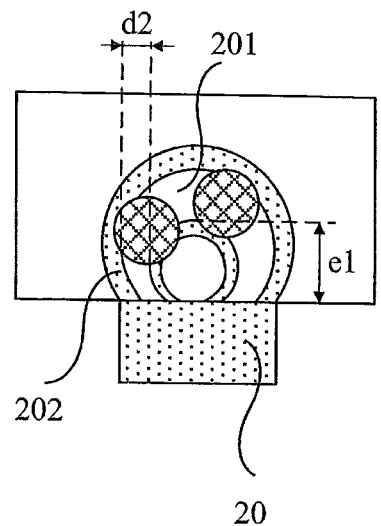
FIG. 4b is a schematic view of another structure of a repairing layer according to an embodiment of the present invention.
Figure 4C:
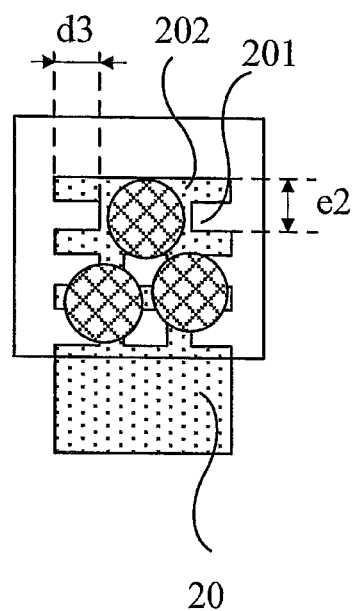
FIG. 4c is a schematic view of a yet structure of a repairing layer according to an embodiment of the present invention.

As an example, the hollow portion 201 may have a shape selected from a ring (as shown in FIG. 2 or 4b), a rectangle (as shown in FIG. 4a), a triangle (not shown) and a mesh (as shown in FIG. 4c). In particular, the graph of the hollow portion 201 may include an all-closed graph and/or a semi-closed graph. For example, the rectangular hollow portion 201 shown in FIG. 4a is semi-closed. Also for example, the ring-shaped hollow portion 201 shown in FIG. 2 or 4b is all-closed. In an example, the mesh-shaped hollow portion 201 shown in FIG. 4c includes the semi-closed left part and right part and the all-closed central parts. The semi-closed hollow portion 201 may be used to reduce the coupling effect of the above parasitic capacitance while the all-closed hollow portion 201 may be used to increase the contact area between the repairing light spot 21 and the repairing layer 20 such that it can ensure conduction between sufficient melt repairing layer and the gate electrode of the TFT or other layer in the laser melting process so as to complete the repairing process. Thus, the skilled person in the art can design the number and shape of the semi-closed or all-closed hollow portion 201 on basis of the requirements for the actual production such that the bright pixel repairing can be achieved while reducing the coupling effect of the parasitic capacitance.

As an example, the pattern of the repairing layer 20 may further include at least two solid portions 202, and wherein a distance between two adjacent ones of the solid portions 202 is within a preset distance range.

It should be noted that the above preset distance range may be determined in advance. In particular, it may be determined depending on the area of the repairing light spot 21. Since the diameter of the repairing light spot 21 may typically be in the range of 5 μm~10 μm. Thus, as an example, the distance between two adjacent ones of the solid portions 202 is 4 μm~9 μm. That is, the distance between two adjacent ones of the solid portions 202 is less than the diameter d of the repairing light spot 21. In this way, it can ensure that the repairing light spot 21 contacts with the solid portion 202 so as to achieve the process of repairing pixel.

Figure 4D:
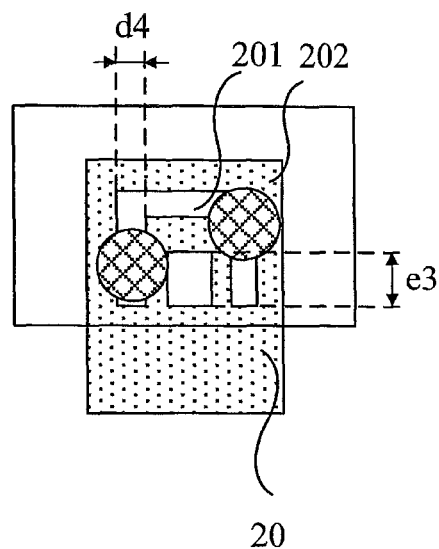
FIG. 4d is a schematic view of a yet structure of a repairing layer according to an embodiment of the present invention.

It should be noted that, the distance between two adjacent ones of the solid portions 202 being less than the diameter d of the repairing light spot 21 means that, for example, a width d1 of a lateral gap of the hollow portion 201 as shown in FIG. 4*a*; a width d2 of a lateral gap and a width e1 of a longitudinal gap of the hollow portion 201 as shown in FIG. 4*b*; a width d3 of a lateral gap and a width e2 of a longitudinal gap of the hollow portion 201 as shown in FIG. 4*c*; and a width d4 of a lateral gap and a width e3 of a longitudinal gap of the hollow portion 201 as shown in FIG. 4*d*. In this way, for the repairing light spot 21 with the diameter d, when the distance between two adjacent ones of the solid portions 202 is less than the diameter d of the repairing light spot, the following requirements should be met: d>d1; d>d2; d>d3; d>d4; d>e1; d>e2; d>e3. Surely, the above examples of shapes of the hollow portion 201 are only exemplified, and the present invention is not limited to this. Other shapes of hollow portion may also be used in embodiments of the present invention.

In this way, by means of providing a plurality of hollow portions 201 on the pattern of the repairing layer 20, it may reduce the requirements for alignment precision when repairing the pixel by enhancing the area of the repairing layer 20 without increasing the parasitic capacitance between the repairing layer 20 and the gate line 11 or the common electrode 10. It can prevent the repairing layer 20 and the repairing light spot 21 from generating adverse effects such as repairing failure due to the alignment deviation of the apparatus or operational problem of operators so as to improve the success chance of repairing the bright pixel.

It should be noted that the repairing layer 20 is electrically connected to the pixel electrode 14, in particular, while ensuring the electrical connection between the repairing layer 20 and the pixel electrode 14, the repairing layer 20 and the pixel electrode 14 may be arranged in the same layer, or in different layers respectively, which may be selected by the skilled person in the art according to the practical production requirements.

In case that the repairing layer 20 and the pixel electrode 14 are arranged in the same layer, the repairing layer 20 may be formed integrally with the pixel electrode 14. In this way, the repairing layer 20 and the pixel electrode 14 may be formed in the same layer by one patterning process so as to simplify the producing procedure.

It should be noted that the repairing light spot 21 with a high energy is produced by the laser in the process of repairing the bright pixel. When the repairing light spot 21 contacts with the solid portion 202, a via may be formed in the region of the solid portion 202 which is melt thermally. The solid portion 202 of the repairing layer 20 may be made of ITO (Indium tin oxide). The melt ITO flows along a wall of the via to be connected with other conductive film layers in the array substrate through the via, such that the driving voltage of the pixel with the bright pixel defect can vary as the signal voltage varies. In this way, the liquid crystal molecules of the pixel can be always in the defection state to present the effect of dark pixel, thereby repairing the bright pixel.

Figure 5:
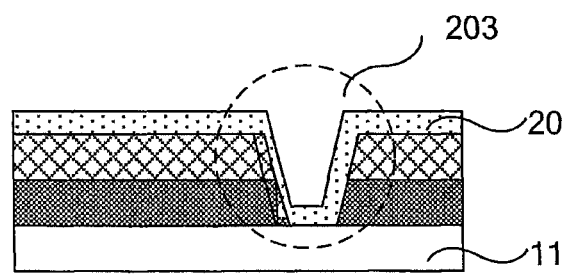
FIG. 5 is a schematic view of a structure of a via according to embodiment of the present invention.

In particular, for the TN (Twist Nematic) type display apparatus as shown in FIG. 2, the solid portion 202 is electrically connected to the gate electrode of the TFT by a first via 203, as illustrated in FIG. 5. The first via 203 is formed by melting the solid portion 202 with the repairing light spot 21. In this way, the electrical connection between the repairing layer 20 and the gate electrode of the TFT allows the driving voltage of the pixel with the bight pixel defect to vary as the signal voltage varies to achieve the repairing of the pixel.

It should be noted that the TN type display apparatus, as a liquid crystal display apparatus on basis of the principle of vertical electrical field, forms a vertical electrical field between the common electrode on the color filter substrate and the pixel electrode on the array substrate opposed to each other to drive the liquid crystal in the twist nematic mode (the vertical electrical field liquid display apparatus has an advantage of large aperture ratio and a disadvantage of narrow angle of view of about 90 degrees).

Figure 6:
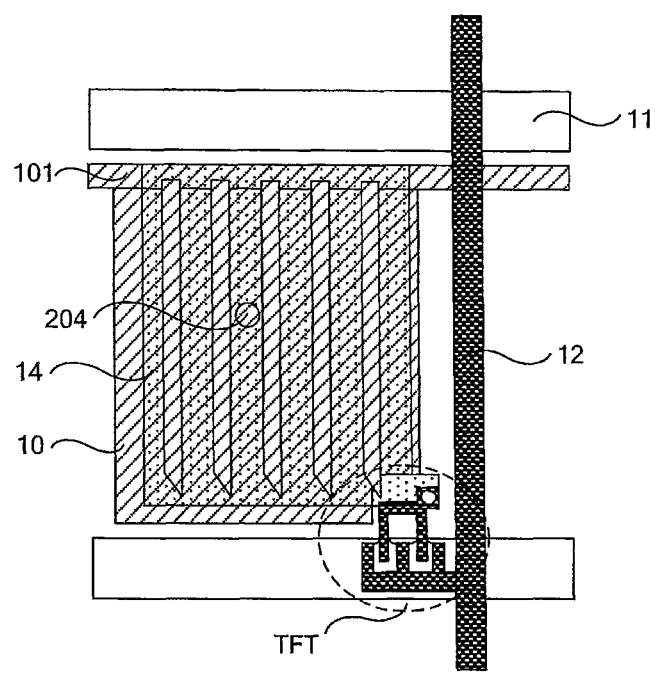
FIG. 6 is a schematic view of another array substrate according to an embodiment of the present invention.

Or, again for example, for AD-SDS (Advanced-Super Dimensional Switching, abbreviated as ADS) type display apparatus, the array substrate may further include a common electrode 10 and a common electrode line 101. As shown in FIG. 6, as a slit-shaped pixel electrode 14 and a planar common electrode 10 are superposed to each other, the repairing layer 20 in the array substrate may be the pixel electrode 14 between two slits and the solid portion 202 of the pattern in the repairing layer 20 is electrically connected to the common electrode 10 or the common electrode line 101 by a second via 204. The second via 204 is formed by melting the solid portion 202 with the repairing light spot 21. In this way, the electrical connection between the repairing layer 20 and the common electrode 10 or the common electrode line 101 allows the driving voltage of the pixel with the bight pixel defect to vary as the signal voltage varies to achieve the repairing of the pixel.

It should be noted that the AD-SDS type display apparatus forms a multi-dimensional electrical field by a parallel electrical field generated by edges of the pixel electrodes in the same plane and a longitudinal electrical field generated between the pixel electrode layer and the common electrode layer to allow the molecules of liquid crystal in all orientations among the pixel electrodes and directly above the electrode in the liquid crystal cell to generate a deflection conversion so as to improve the working efficiency of the liquid crystal in planar orientation and to enhance the light transmission efficiency. The common electrode and the pixel electrode of the ADS type display apparatus are both arranged on the array substrate. The common electrode and the pixel electrode may be arranged in different layers. In this arrangement, the electrode in the upper layer includes a plurality of bar electrodes while the electrode in the lower layer includes a plurality of bar electrodes or is a plate-shaped electrode.

It should be noted that as the region in which the repairing layer 20 is located according to an embodiment of the present invention is enlarged, it may improve the chance of success in welding by two (as shown in FIGS. 4*a*, 4*b*, 4*c*) or more (as shown in FIG. 4*c*) repairing light spots 21 of the laser beam in the region, thereby improving the applicability and reliability of repairing the bright pixel more efficiently.

An embodiment of the present invention provides a display apparatus including an array substrate as any one of above embodiments, and has the same advantages as those of the array substrate in the above embodiment of the present invention. Since the array substrate has been explained in detail in the above embodiments, the specific description thereof will be omitted below.

In the embodiment of the present invention, the display apparatus in particular may include a liquid crystal display apparatus, for example, any products or components having a displaying function, such as a liquid crystal display, a liquid crystal TV, a digital photo frame, a cell phone or a tablet computer.

The display apparatus according to an embodiment of the present invention includes an array substrate. It includes a thin film transistor, a pixel electrode, a gate line and a data line crossing with each other and a repairing layer. The repairing layer is electrically connected to the pixel electrode, has an area within the preset area range of the repairing layer and has a pattern including at least one hollow portion. In this way, the above hollow portion may be used to reduce the coupling effect of the parasitic capacitance between the repairing layer and the gate line or the common electrode or the common electrode line. In addition, by increasing the area of the repairing layer, it may reduce the difficulty of alignment of the repairing laser beam during repairing the bright pixel such that the repairing efficiency can be enhanced and the yield of products can be improved.

An embodiment of the present invention also provides a method for producing any array substrate as described, including a method of forming the thin film transistor TFT, the pixel electrode 14, as well as the gate line 11 and the data line 12 crossing with each other. The method for producing any array substrate as described may further include:

forming the repairing layer 20 electrically connected to the pixel electrode 14 integrally on the substrate.

As an example, the repairing layer 20 electrically connected to the pixel electrode 14 may be formed integrally on the substrate by the patterning process. The patterning process may include a lithographic process, or include a lithographic process and an etching process and may further include other processes for forming a predetermined pattern such as printing or ink jetting. The lithographic process means a process for forming a pattern using photo resist, mask, exposure machine and the like and including processes of film molding, exposing and developing and the like. The patterning process may be selected correspondingly according to the structure formed in an embodiment of the present invention.

An embodiment of the present invention provides a method for producing any array substrate as described in the above examples. The method includes the process of producing a thin film transistor, a pixel electrode, a gate line and a data line crossing with each other and further includes forming a repairing layer on the substrate. The repairing layer is electrically connected to the pixel electrode, has an area within the preset area range of the repairing layer and has a pattern including at least one hollow portion. In this way, the above hollow portion may be used to reduce the coupling effect of the parasitic capacitance between the pattern of the repairing layer and the gate line or the common electrode or the common electrode line. In addition, by increasing the area of the repairing layer, it may reduce the difficulty of alignment of the repairing laser beam during repairing the bright pixel such that the repairing efficiency can be enhanced and the yield of products can be improved.

An embodiment of the present invention provides a method for producing an array substrate, including the process of repairing the array substrate as described in any one of the above examples.

It should be noted that the repairing light spot 21 with a high energy is produced by the laser in the process of repairing the bright pixel. When the repairing light spot 21 contacts with the solid portion 202, a via may be formed in the region of the solid portion 202 which is melt thermally. The solid portion 202 may be made of ITO (Indium tin oxide). The melt ITO flows along a wall of the via to be connected with other conductive film layers in the array substrate through the via, such that the driving voltage of the pixel with the bright pixel defect can vary as the signal voltage varies. In this way, the liquid crystal molecules of the pixel may be always in the defection state to present the effect of dark pixel, thereby repairing the bright pixel.

In particular, for the TN type display apparatus as shown in FIG. 2, the above repairing method may include:

as illustrated in FIG. 5, on the surface of the pattern of the repairing layer 20, when the repairing light spot 21 contacts with the solid portion 202, the first via 203 is formed by melting the solid portion 202 by the repairing light spot 21 such that the solid portion 202 is electrically connected to the gate electrode of the TFT by the first via 203.

In the above example, the first via 203 is formed by bring the repairing light spot 21 in contact with the solid portion 202 and melting the solid portion 202. In this way, the electrical connection between the repairing layer 20 and the gate electrode of the TFT allows the driving voltage of the pixel with the bright pixel defect to vary as the signal voltage varies to achieve the process of repairing the pixel.

It should be noted that the TN type display apparatus, as a liquid crystal display apparatus on basis of the principle of vertical electrical field, forms a vertical electrical field between the common electrode on the color filter substrate and the pixel electrode on the array substrate opposed to each other to drive the liquid crystal in the twist nematic mode (the vertical electrical field liquid display apparatus has an advantage of large aperture ratio and a disadvantage of narrow angle of view of about 90 degrees).

An embodiment of the present invention provides a method for repairing the array substrate as described in any one of the above examples. The method includes forming the first via on the surface of the pattern of the repairing layer by melting the solid portion with the repairing light spot when the repairing light spot contacts with the solid portion such that the solid portion is electrically connected to the gate electrode of the TFT by the first via. In this way, the above hollow portion may be used to reduce the coupling effect of the parasitic capacitance between the pattern of the repairing layer and the gate line. In addition, by increasing the area of the repairing layer, it may reduce the difficulty of alignment of the repairing laser beam such that the repairing efficiency can be enhanced and the yield of products can be improved.

Or, again for example, for AD-SDS (Advanced-Super Dimensional Switching, abbreviated as ADS) type display apparatus, the array substrate may further include a common electrode 10 and a common electrode line 101. Thus, the above repairing method may further include:

as shown in FIG. 6, forming the second via 204 on the pattern surface of the repairing layer 20 by melting the solid portion with the repairing light spot 21 when the repairing light spot 21 contacts with the solid portion 202 such that the solid portion 202 is electrically connected to the common electrode 10 or the common electrode line 101 by the second via 204.

In the above example, the second via 204 is formed by bringing the repairing light spot 21 in contact with the solid portion 202 and melting the solid portion 202. In this way, the electrical connection between the repairing layer 20 and the common electrode 10 or the common electrode line 101 allows the driving voltage of the pixel with the bight pixel defect to vary as the signal voltage varies to achieve the repairing of the pixel.

Although several exemplary embodiments have been shown and described, the present invention is not limited to those and it would be appreciated by those skilled in the art that various changes or modifications may be made in these embodiments without departing from the principles and spirit of the disclosure. These changes or modifications will fall within the scope of the present invention. The scope of the present invention is defined in the claims and their equivalents.

What is claimed is:

1. An array substrate, comprising:
   a thin film transistor;
   a pixel electrode;
   a gate line and a data line crossing with each other; and
   a repairing layer connected electrically to the pixel electrode,
   wherein the repairing layer has an area within a preset area range of the repairing layer which depends on an area of a repairing light spot, and
   wherein the repairing layer has a pattern comprising at least one hollow portion and has an area greater than that of the repairing light spot.

2. The array substrate according to claim 1, wherein the hollow portion has a shape selected from a ring, a rectangle, a triangle and a mesh.

3. The array substrate according to claim 1, wherein the repairing layer has an area greater than 16 $\mu m^2$.

4. The array substrate according to claim 1, wherein the pattern of the repairing layer further comprises at least two solid portions, and wherein a distance between two adjacent ones of the solid portions is within a preset distance range which depends on the area of the repairing light spot.

5. The array substrate according to claim 4, wherein the distance between two adjacent ones of the solid portions is less than a diameter of the repairing light spot.

6. The array substrate according to claim 4, wherein the distance between two adjacent ones of the solid portions is 4 $\mu m$~9 $\mu m$.

7. The array substrate according to claim 1, wherein the repairing layer and the pixel electrode are of an integrated structure.

8. The array substrate according to claim 4, wherein the solid portions are electrically connected to a gate electrode of the thin film transistor by a first via.

9. The array substrate according to claim 1, wherein the array substrate further comprises a common electrode and a common electrode line, the pattern of the repairing layer further comprising a solid portion which is electrically connected to the common electrode or the common electrode line by a second via.

10. A display apparatus comprising an array substrate, the array substrate comprising:
    a thin film transistor;
    a pixel electrode;
    a gate line and a data line crossing with each other; and
    a repairing layer connected electrically to the pixel electrode,
    wherein the repairing layer has an area within a preset area range of the repairing layer which depends on an area of a repairing light spot, and
    wherein the repairing layer has a pattern comprising at least one hollow portion and has an area greater than that of the repairing light spot.

11. The display apparatus according to claim 10, wherein the hollow portion has a shape selected from a ring, a rectangle, a triangle and a mesh.

12. The display apparatus according to claim 10, wherein the repairing layer has an area greater than 16 $\mu m^2$.

13. The display apparatus according to claim 10, wherein the pattern of the repairing layer further comprises at least two solid portions, and wherein a distance between two adjacent ones of the solid portions is within a preset distance range which depends on the area of the repairing light spot.

14. The display apparatus according to claim 13, wherein the distance between two adjacent ones of the solid portions is 4 $\mu m$~9 $\mu m$.

15. The display apparatus according to claim 10, wherein the repairing layer and the pixel electrode are of an integrated structure.

16. The display apparatus according to claim 13, wherein the solid portions are electrically connected to a gate electrode of the thin film transistor by a first via.

17. The display apparatus according to claim 10, wherein the array substrate further comprises a common electrode and a common electrode line, the pattern of the repairing layer further comprising a solid portion which is electrically connected to the common electrode or the common electrode line by a second via.

18. A method for repairing an array substrate, the array substrate comprising: a thin film transistor; a pixel electrode; a gate line and a data line crossing with each other; and a repairing layer connected electrically to the pixel electrode, wherein the repairing layer has an area within a preset area range of the repairing layer which depends on an area of a repairing light spot, and wherein the repairing layer has a pattern comprising at least one hollow portion and at least two solid portions, the method comprising:
    when the repairing light spot contacts with the solid portions, forming a first via on a surface of the pattern of the repairing layer by melting the solid portions with the repairing light spot, such that the solid portions are electrically connected to a gate electrode of the thin film transistor by the first via,
    wherein the repairing layer has an area greater than that of the repairing spot.

19. The method according to claim 18, wherein the array substrate further comprises a common electrode and a common electrode line, the method further comprising:
    when the repairing light spot contacts with the solid portions, forming a second via on a surface of the pattern of the repairing layer by melting the solid portions with the repairing light spot, such that the solid portions are electrically connected to the common electrode or the common electrode line by the second via.

* * * * *